R. H. POGUE.
SAFETY HITCH.
APPLICATION FILED APR. 19, 1918.
1,344,818.
Patented June 29, 1920.
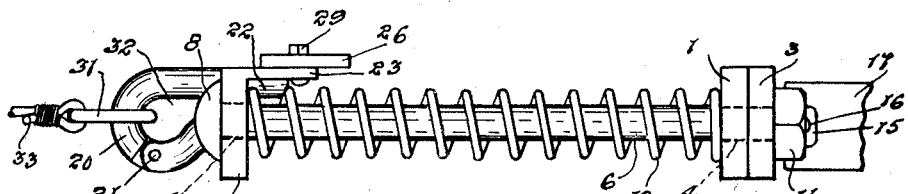
Fig. 1
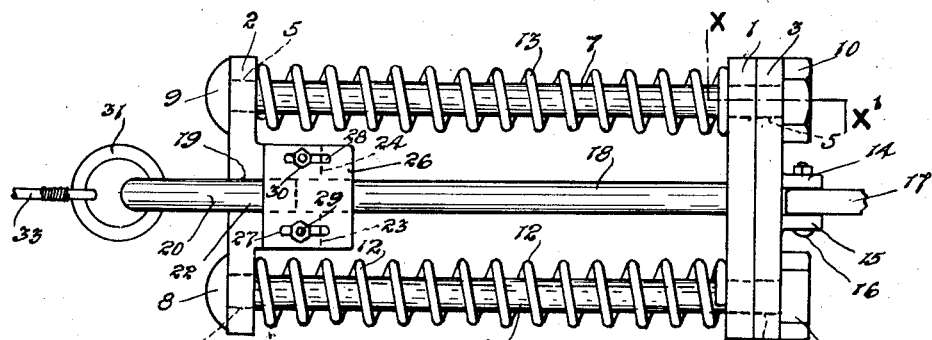
Fig. 2
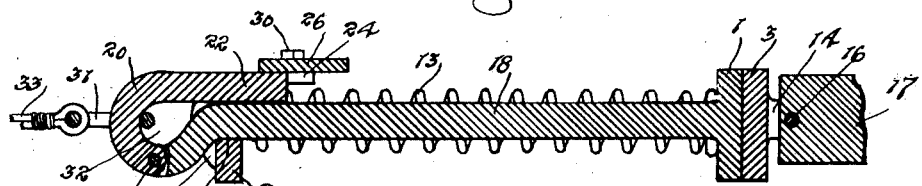
Fig. 3
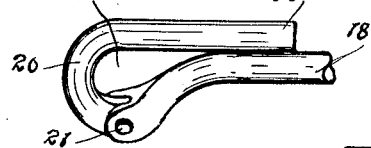
Fig. 4
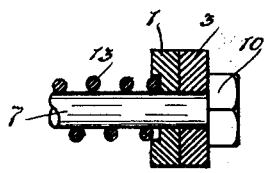
Fig. 7
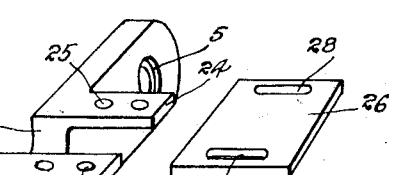
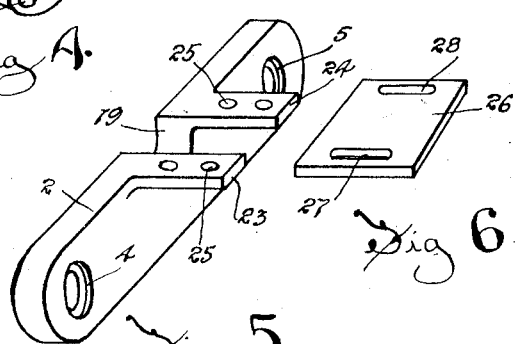
Fig. 5
Fig. 6
INVENTOR
R. H. Pogue
BY
ATTYS

UNITED STATES PATENT OFFICE.

ROBERT H. POGUE, OF WINNIPEG, MANITOBA, CANADA.

SAFETY-HITCH.

1,344,818. Specification of Letters Patent. Patented June 29, 1920.

Application filed April 19, 1918. Serial No. 229,637.

*To all whom it may concern:*

Be it known that I, ROBERT H. POGUE, of the city of Winnipeg, in the Province of Manitoba, Canada, have invented certain new and useful Improvements in Safety-Hitches, of which the following is the specification.

The invention relates to improvements in safety hitches particularly as used in agricultural and such work and the principal object of the invention is to provide a hitch which will take up the strain of the load under normal conditions and will automatically unhitch to release the load upon the strain becoming excessive.

A further object of the invention is to make the hitch adjustable whereby one can determine approximately the time at which it will release to free the excessive load.

A still further object of the invention is to construct the hitch in a simple and durable manner so that it can be readily assembled, manufactured and applied.

With the above objects in view the invention consists essentially in the arrangement and construction of parts hereinafter more particularly described and later pointed out in the appended claim, reference being had to the accompanying drawing in which:—

Figure 1 represents a plan view of the safety hitch.

Fig. 2 represents a side view of the same.

Fig. 3 represents a longitudinal sectional view centrally through the hitch.

Fig. 4 represents a perspective view of the pivoted hook or catch.

Fig. 5 represents a perspective view of the rear head plate.

Fig. 6 represents a perspective view of the adjusting plate.

Fig. 7 represents a horizontal sectional view through the hitch, the section being taken in the plane denoted by the line X—X' Fig. 2.

In the drawing like characters of reference indicate corresponding parts in the several figures.

In order that the device may be better understood I may here state that the hitch will be used in a location such as between the draw bar of a traction engine and the agricultural implement which the engine may be drawing and the hitch is adapted to automatically release and free the agricultural implement upon the load becoming excessive, thereby avoiding breakage or other damage as occurs in instances where no release is provided.

1 represents a front head plate, 2 a rear head plate, and 3 a draft plate, which plates are of the same size and are each provided with a pair of openings 4 and 5, the openings being axially alined whereby when the plates are set up they will receive the rods later disclosed.

Two side rods 6 and 7 connect the plates 1, 2 and 3 passing through the openings and both side rods are provided at the rear end with heads 8 and 9 and at the forward end with nuts 10 and 11 screwing onto the forward threaded ends of the rods.

From the above it will be apparent that these rods are in reality ordinary bolts fitted with nuts.

On these rods I mount compression springs 12 and 13 which are normally extended and have their ends bearing against the head plates 1 and 2 whereby the head plates are held apart and with the front plate 1 against the draft plate 3.

The draft plate is provided centrally with a pair of lugs 14 and 15 which carry a hitching bolt 16 which is actually passed through the rear end of the draw bar 17 of the tractor (not shown).

18 represents a centrally disposed draft rod extending rearwardly from the central portion of the head plate 1 and passing slidably through a rear slot 19 provided in the rear head plate.

The rear end of the rod 18 is provided with a swinging catch or hook 20 pivoted to the rod at 21 and which is constructed with a forward extension 22 designed in the normal or closed position of the catch to lie directly above the body of the rod and within the slot 19.

The head plate 2 is provided with two forwardly extending spaced brackets 23 and 24 located at opposite sides of the slot and having their upper faces contained in the same horizontal plane as the upper side of the extension 22. These brackets are fitted with adjusting openings 25 and are provided to carry an adjusting plate 26 supplied with lengthwise extending slots 27 and 28 designed to register with the openings 25.

Adjusting bolts 29 and 30 are supplied to hold the adjusting plate in any adjusted position on the brackets.

From the above disclosure it will be apparent that the adjusting plate serves to retain the extension 22 in a closed position until such time that the extension is pulled rearwardly far enough to allow the forward end thereof to escape past the rear end of the adjusting plate.

31 represents a ring passed through the eye 32 of the hook and 33 represents a hitching cable or such like attached to the ring and passing to the agricultural implement (not shown) which is to be drawn and which is in reality the load.

In actual practice the springs 12 and 13 of the hitch are of a strength such that they will carry the normal load without allowing the extension 19 to pull back far enough to free from the adjusting plate. Accordingly then when the load is being pulled under normal conditions the springs will close in and open up slightly, fluctuating with the slight variations as may occur in drawing the load and in this connection it will be observed that as the draw bar holds the draft plate 3 and the load is directly connected through the rod 18 with the plate 1 the load is distributed through the springs to the rear head plate which is anchored by the rods 6 and 7 to the front draft plate.

Upon an excessive pull being brought on the cable 33, such as by the agricultural implement, say a plow, striking a root or stone the springs will be collapsed sufficiently to allow the extension 22 to escape from the adjusting plate and the instant it escapes the hook swings back releasing the ring and freeing the load. Accordingly no damage is done to the hitch.

It will be obvious that the springs can be of a predetermined strength to carry the normal load and accordingly one with a little experience can determine just how to set the adjusting plate so that he will not be bothered by the hitch undoing under ordinary working conditions.

In this connection it will be observed that the farther the plate is fastened ahead the quicker the load will be released in the back pulling of the draft rod and the farther the plate is set to the rear the later the release.

In the above disclosure it will be apparent that the various parts could be readily modified without in the least departing from the spirit of the invention as covered by the scope of the appended claim.

What I claim as my invention is:—

A safety hitch comprising front and rear head plates resiliently spaced apart, a draft rod extending rearwardly from the front head plate and passing slidably through an open slot provided in the rear head plate, a catch pivotally secured to the rear end of the rod and provided with a forward extension lying upon the slot, arms extending forwardly from the rear head plate and on opposite sides of said slot, and a plate adjustably supported on said arms and bridging the space therebetween to overlie the forward extension of the catch.

Signed at Winnipeg, this 23 day of March, 1918.

ROBERT H. POGUE.

In the presence of—
 G. S. ROXBURGH,
 K. B. WAKEFIELD.